United States Patent [19]
Weiss et al.

[11] Patent Number: 5,812,220
[45] Date of Patent: *Sep. 22, 1998

[54] TELEVISION TRANSMISSION SYSTEM HAVING SIGNAL AND ANTENNA ELEMENT REDUNDANCY

[76] Inventors: S. Merrill Weiss, 25 Mulberry La., Edison, N.J. 08820-2908; Joseph J. Giardina, 32 Judson St., A14B, Edison, N.J. 08837

[*] Notice: The terminal 17 months of this patent has been disclaimed.

[21] Appl. No.: 399,164

[22] Filed: Mar. 2, 1995

[51] Int. Cl.$^6$ ........................................................ H04N 5/38
[52] U.S. Cl. .................................................. 348/723; 455/6.1
[58] Field of Search .............................. 348/723; 455/3.1, 455/6.1, 3.3; H04N 5/38

[56] References Cited

U.S. PATENT DOCUMENTS

4,532,543  7/1985  Groenewegen ........................... 455/6.7
4,549,185  10/1985  Dixon ....................................... 455/6.7

*Primary Examiner*—Victor R. Kostak
*Attorney, Agent, or Firm*—Furgang & Milde, LLP

[57] ABSTRACT

A television (TV) transmission system is adapted to receive a plurality of TV signals and to transmit these TV signals at a plurality of channel frequencies using multi-bay antenna. The system includes a plurality of exciters, each exciter receiving a one of the TV signals and operative to combine the TV signal with a carrier signal at a respective one of the channel frequencies to produce a transmittable signal. Each exciter is coupled to a signal splitter which produces a plurality of split signals from the transmittable signal. A separate power amplifier is coupled to receive each split signal and passes an amplified signal to a power combiner which produces a single combined output signal. A plurality of such power combiners pass their respective output signals to a plurality of antenna elements arranged to radiate as a group.

12 Claims, 8 Drawing Sheets

"Existing NTSC Antenna Apertures"

Fig. 8

TELEVISION TRANSMISSION SYSTEM HAVING SIGNAL AND ANTENNA ELEMENT REDUNDANCY

BACKGROUND OF THE INVENTION

The present invention relates to a television transmission system which incorporates a plurality of RF exciters (one per channel), a plurality of RF amplifiers, a plurality of RF power splitters and combiners and a single multi-bay antenna having antenna elements arranged in a phased array. This transmission system is intended to offer multiple user, high power digital transmission capability utilizing multiple (a plurality of) transmission lines and either existing or new multi-bay antennas.

Traditionally, RF transmission systems for TV broadcast applications incorporate a single high power transmitter, a primary antenna, an optional secondary antenna as a fail-safe backup and a dedicated transmission line for each.

Alternatively, multiple TV broadcasters have elected to collectively develop a common transmission and antenna system. These diplexed systems have incorporated multiple high power transmitters, a high power combiner, a single transmission line and a primary and optional secondary antenna.

In some cases, multiple broadcasters have shared a common transmission line to provide the RF signal to multiple antennas. These systems have incorporated multiple high power transmitters, a high power combiner, and a single transmission line leading to a signal splitter. Multiple antennas are connected to this signal splitter each through a separate bandpass filter.

With the advent of digital television, it will be necessary to design and construct additional high power RF transmission systems to provide the new digital television service. However, many of the existing television antenna structures are incapable of supporting the required additional antennas and transmission lines. The problem of tower loading is exacerbated when multiple broadcasters share a common tower structure with little remaining space and/or structural load capacity.

SUMMARY OF THE INVENTION

The principal object of the present invention, therefore, is to provide a television (TV) transmission system adapted to receive a plurality (n) of TV signals, V1, V2 ... Vi, ... Vn, and to transmit these TV signals at a plurality (n) of channel frequencies, Q1, Q2, ... Qi, ... Qn, respectively, using a multi-bay antenna.

It is a further object of the present invention to provide a TV transmission system which offers a high degree of redundancy to each broadcaster.

A further object of the present invention is to provide a TV transmission system which provides variable antenna coverage patterns.

These objects, as well as other objects which will become apparent from the discussion that follows, are achieved, in accordance with the present invention, by a system which includes:

(a) a plurality (n) of exciters, A1, A2, ... Ai, ... An, each exciter, Ai, having an input for receiving one of the TV signals, Vi, and operative to combine the TV signal with a carrier signal at a respective one of the channel frequencies, Qi, to produce a transmittable signal, Ti;

(b) a plurality (n) of signal splitters, B1, B2 ... Bi, ... Bn, each splitter, Bi, being coupled to receive a transmittable signal, Ti, from a corresponding one of the exciters, Ai, and producing therefrom a plurality (m) of splitter signals, S1, S2 ... Si, ... Sm;

(c) a plurality of phase shifting/amplitude adjusting networks, each connected to receive one of the signals, Si;

(d) a plurality of power amplifiers—one per channel up to one per antenna feed—connected to receive the outputs of the networks;

(e) a plurality (j) of power combiners, E1, E2 ... Ei, ... Ej, each power combiner, Ei, coupled to receive an amplified signal, from a plurality of the power amplifiers, and producing therefrom a single combined output signal, Oi;

(f) a plurality (k) of antenna elements, M1, M2 ... Mi, ... Mk, each antenna element, Mi, coupled to receive the output signal, Oi, of one of the power combiners.

The antenna elements, which radiate electromagnetic waves in response to their received signals, may all be associated with a single, multi-element, wideband antenna. This antenna may be newly installed in a tower site or form a part of an existing antenna tower structure.

The TV transmission system according to the present invention thus incorporates multiple RF exciters (one per channel), multiple RF power amplifiers, RF splitters and combiners and a single multi-bay antenna. An exciter is provided for each channel transmitted by the system. Additional exciters may be provided for redundancy. The use of redundant exciters is well known and, therefore, is not described herein in detail.

The ultimate antenna system architecture is dependent upon several variables: The total number of broadcasters; the intermodulation permutations of the various channels used in the system and the number of antenna panels (antenna elements) available for transmission. In the preferred embodiment of the invention, the antenna system is configured for twelve (12) broadcasters. Each antenna panel utilizes twelve (12) power amplifiers and the antenna is composed of forty-eight (48) individual panels. While this specific configuration has been chosen to explain the invention, almost any combination of exciters, amplifiers and antenna panels is possible.

The frequency of each participant's exciter is on a specific assigned channel for that particular broadcaster. The on-channel output of the exciter is divided into multiple, equal value RF signals by means of an RF splitter.

The number of outputs required from the splitters is dependent upon the total number of panels used in the multi-panel antenna. In the exemplary preferred embodiment, the antenna has forty-eight (48) panels, which require a 1×48 RF splitter.

The individual outputs of the RF splitter are connected to individual phase shifting and amplitude adjusting devices. These devices permit fine adjustments to the phase and amplitude of the signals that are applied to the RF power amplifiers.

The outputs of the phase shifters and amplitude adjusting devices optionally can be selectively connected to the inputs of low level RF combiners prior to amplification. In this case, fewer amplifiers can be used with individual amplifiers carrying the signals from two or more broadcast stations. As is well known, attention must be paid to the combination of frequencies that are applied to the input of the combiner and subsequently to the input of the amplifier since intermodulation products generated in the amplifier will result in undesired RF emissions.

The optional combiner configuration is dependent upon the total number of RF channels and the number of amplifiers required in each group to control intermodulation products (with one amplifier per channel, in the limit). The preferred optional embodiment of the invention uses a group of four (4) amplifiers per antenna panel and twelve (12) broadcast channels. Therefore, 3×1 combiners (12 channels divided by 4 amplifiers) are necessary to combine the signals into each amplifier.

The outputs of the individual RF amplifiers in a group are connected to the inputs of an RF power combiner.

This amplifier/combiner configuration is dependent upon the number of amplifiers used. In the preferred embodiment of the invention, twelve (12) amplifiers are used, so that a 12×1 combiner is provided.

The RF power combiner includes a three (3) port circulator through which the amplified output is fed to an antenna transmission line. The circulator prevents transmission line mismatches, in particular antenna anomalies, from adversely affecting the amplifier performance and generating echoes in the system. The individual outputs of the forty-eight (48) power combiner/circulators are connected to the antenna elements via individual transmission lines. The transmission line size is dependent upon the antenna panel input rating, the RF amplifier output rating and/or acceptable system losses.

The output of each RF channel (the 48 amplified and combined signals) may be monitored at the output of each transmission line via a computer controlled spectrum analyzer in a manner well known in the art. The spectrum analyzer isolates each individual carrier (channel frequency) for measurement purposes. The measured RF level is fed to the system controller which, in turn, maintains the specified RF power for the selected antenna pattern for each channel.

The TV transmission system according to the invention exhibits a number of advantages over conventional transmission systems. These include:

(1) System Redundancy: The system according to the invention provides a high level of redundancy. The use of individual amplifiers for individual antenna panels allows amplifier failures to only marginally affect the antenna pattern without causing an overall system or channel failure.

(2) Custom Antenna Patterns: The antenna pattern of the multi-bay antenna can be shifted or adjusted as desired using adjustable phase shifters feeding the individual power amplifiers. The antenna pattern can thus be customized for each individual channel in the system. If desired, automatic pattern selections can be made using computer controlled phase shifters and RF attentuators.

(3) System Repairability: The use of a multi-bay antenna allows selected portions of the system to be taken off line for repair. System repairs can be effected by instructing the system controller to shut down the RF energy to a specific panel, group of panels or an entire antenna bay. This flexibility allows for the immediate repair of defective components.

(4) Use of Existing Tower Structures: New television antenna systems, according to the invention, may be constructed using existing tower structures with minimal, or no, impact on existing broadcast services.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1–8 of the drawings. Identical elements in the various figures are designated with the same reference numerals.

Figure 1:
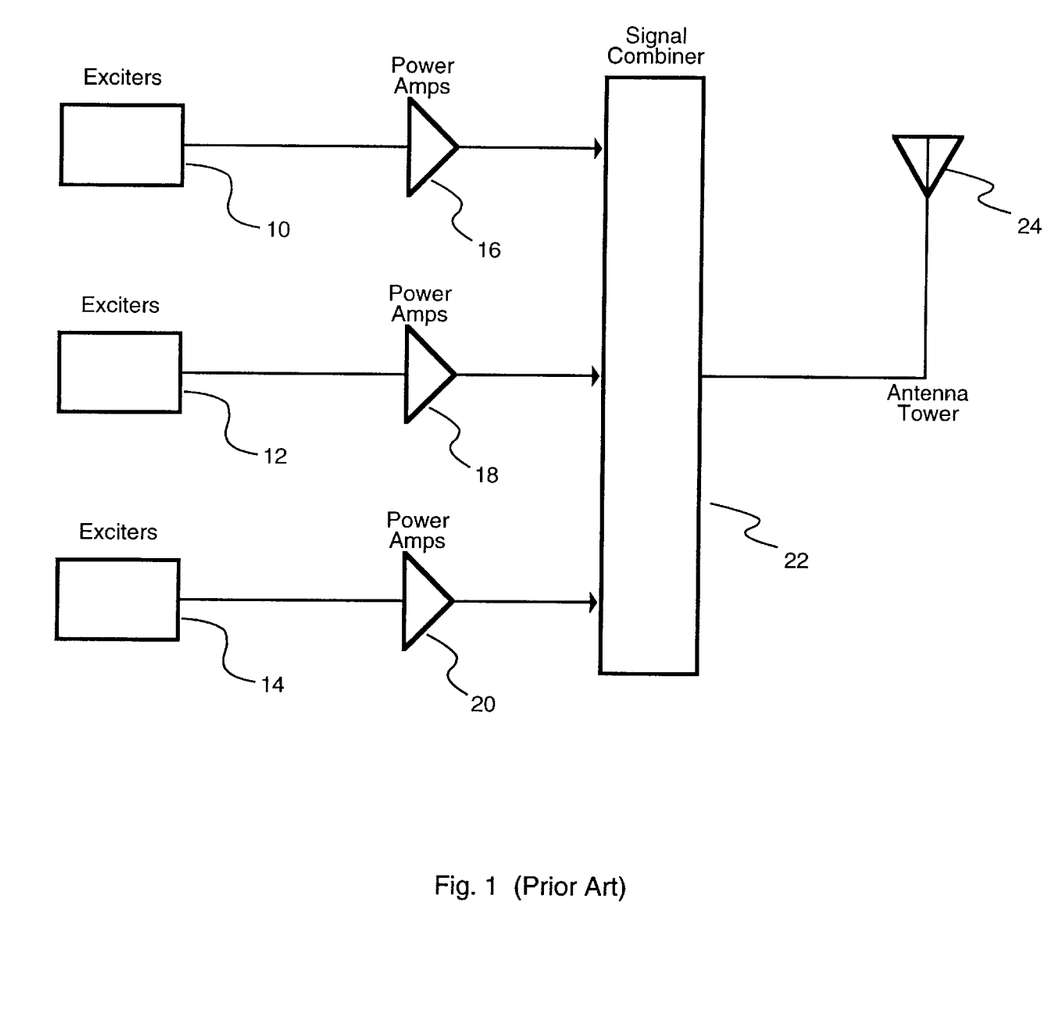
FIG. 1 is a block diagram of a TV antenna system wherein three broadcasters share a single antenna.
Figure 2:
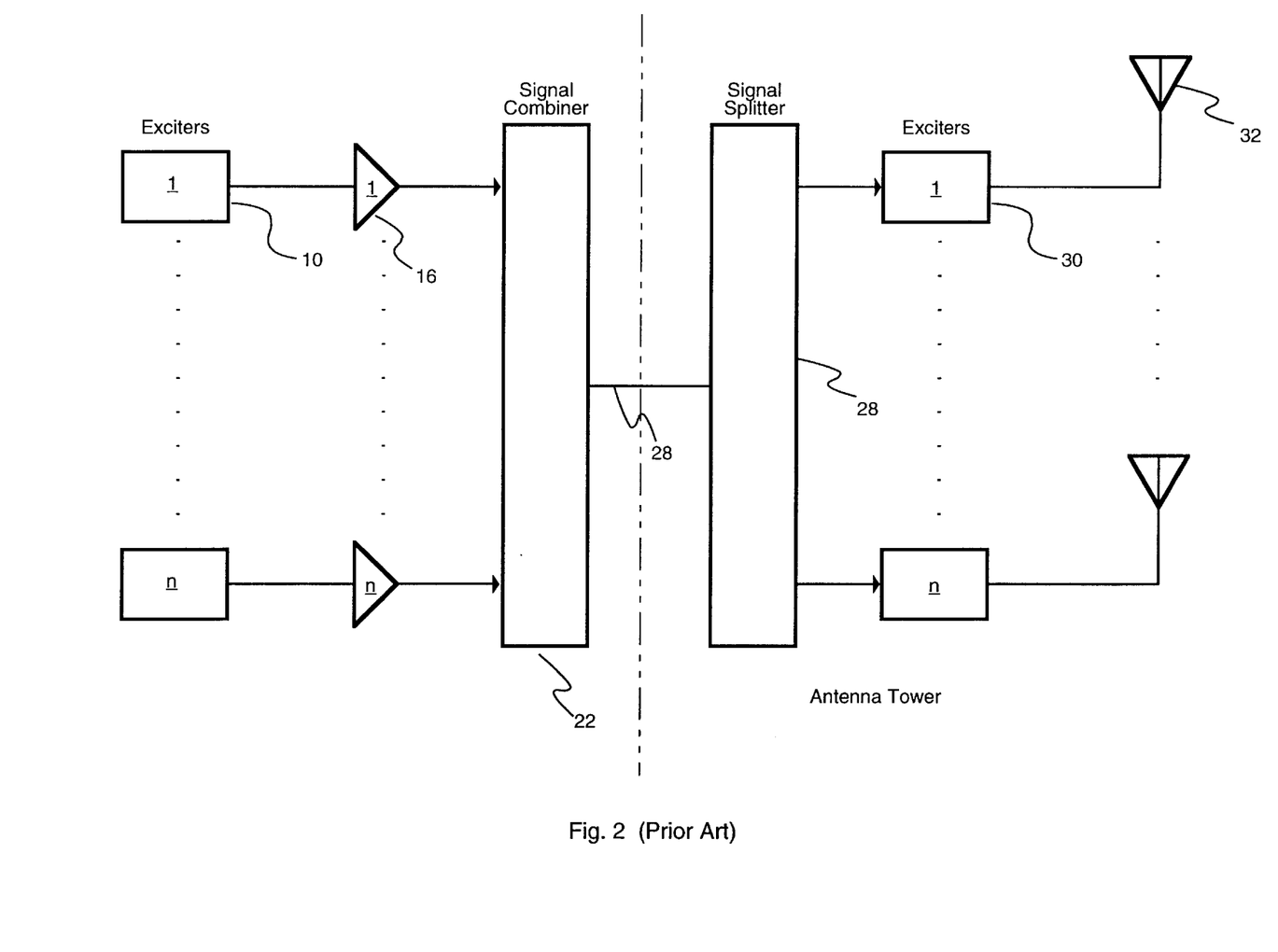
FIG. 2 is a block diagram of a TV antenna system wherein a plurality (n) of broadcasters transmit using a plurality (n) of antennas, but share a common transmission line.

FIGS. 1 and 2 illustrate two common TV antenna systems as they are known in the prior art. In the system shown in FIG. 1, three television broadcasters—for example, on channels 2, 4 and 5—transmit from an antenna tower using a single antenna which is tuned for all three channels. Separate audio and video signals for channels 2, 4 and 5 are supplied to the RF exciters 10, 12 and 14, respectively. The exciters add the necessary RF carrier, modulating the video signal with amplitude modulation and the audio signal with frequency modulation.

The modulated carrier signals produced by the exciters 10, 12 and 14 are supplied to power amplifiers 16, 18 and 20, respectively. As an example, each power amplifier may provide 10 kilowatts of output power. The amplified signal is then supplied to a wideband signal combiner 22 which sums the signals and supplies them to a common antenna 24 on a tower structure via a transmission line 26. If each power amplifier produces 10 kilowatts, the antenna will be driven with 30 KW of power.

Referring to FIG. 2, the TV antenna system is essentially identical to that of FIG. 1 with the exception of the apparatus arranged in the antenna tower. Within the antenna tower is an RF signal splitter 28 which receives the multiple RF signals on the common transmission line 26. The signal splitter divides the signal into the same number (n) of signals as there are broadcasters. These signals are each supplied to a bandpass filter 30, each tuned to different channel frequency. As a consequence, the signal originally supplied to the signal combiner 22 is restored to the n separate transmission lines and supplied, with the power of 10 KW, to separate antennas.

Figure 3:
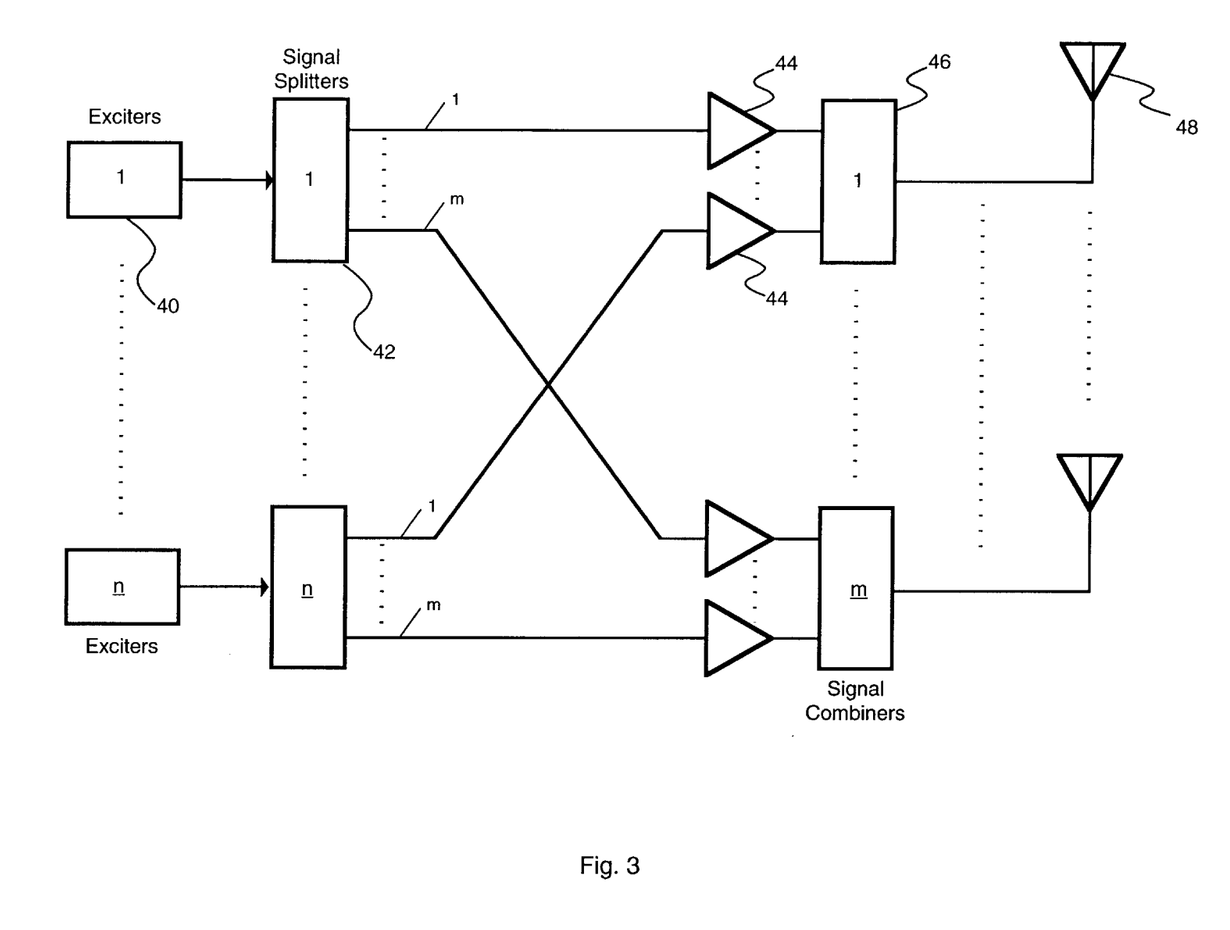
FIG. 3 is a block diagram of a TV transmission system according to the present invention, wherein a plurality (n) of broadcasters transmit on a plurality (m) of antenna elements.

The general concept of the present invention is illustrated in FIG. 3. In this case, a plurality (n) of RF exciters 40 supply RF signals to a like number (n) of RF signal splitters 42. Each signal splitter has plurality (m) of outputs which are each connected to one of a plurality (m) of RF power amplifiers 44. Each power amplifier supplies the amplified signal to a signal combiner 46 which transmits the signal to a single antenna 48.

The TV antenna system of FIG. 3 has an advantage of redundancy over the systems of FIGS. 1 and 2. In particular, if one of the power amplifiers 44, signal combiners 46 or antennas 48 should fail, all of the broadcast signals will still be transmitted using the remaining power amplifiers, signal combiners and antennas. The antennae are preferably substantially directional and are arranged to radiate in a plurality of different horizontal directions. Thus, if transmission from one antenna drops out, this lack of transmission will affect only a small geographical area.

Figure 4:
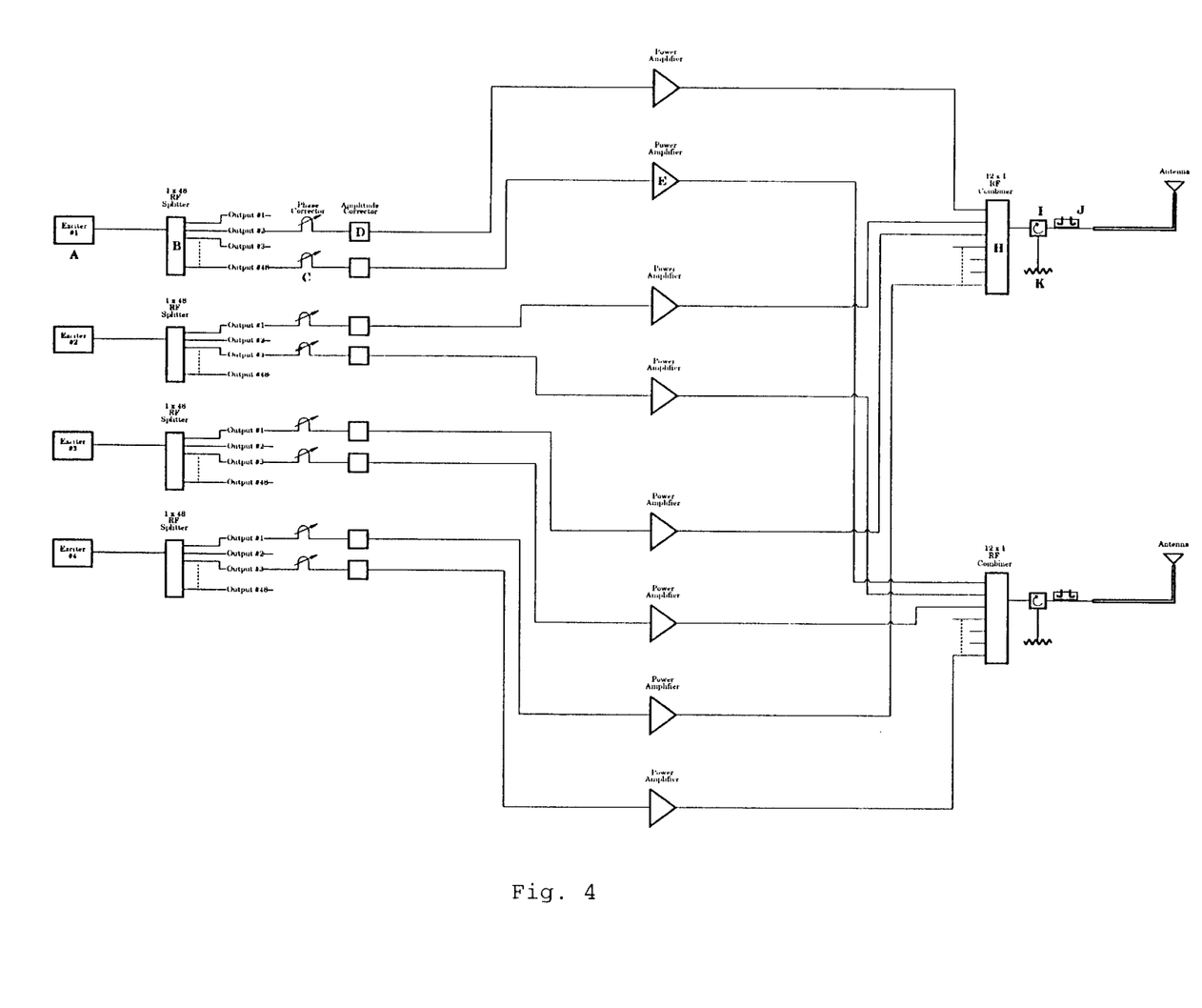
FIG. 4 is a block diagram of a TV transmission system according to the preferred embodiment of the present invention.

FIG. 4 illustrates the preferred embodiment of the TV antenna system according to the present invention which is specifically intended for digital transmission. This system can also be used for conventional television signals and other forms of broadcasting, however.

For descriptive purposes, only two RF channels of a multi-user, multi-panel antenna system are shown. The letters shown in brackets "[ ]" reference specific equipment which is explained below.

The digital television information is modulated and up-converted to the appropriate channel in the RF exciter unit [A]. The on-channel RF output signal of the exciter is fed into the input of a 1×48 RF splitter [B]. The forty-eight (48) individual outputs of this splitter are used to selectively feed, via individual phase shifters [C] and amplitude controllers [D], the inputs of forty-eight (48) RF power amplifiers [E].

The output of each power amplifier [E] is then fed to the input of a high power 12×1 RF combiner [H].

The output of the 12×1 combiner contains all of the amplified RF signals for all of the system constituents.

Circulators [I] are provided in each transmission line to isolate load variations and to present an adequate impedance match for the amplifier. Reject power from the antenna system is dissipated in a load [K] attached to one port of the circulator. The circulator function [I] may be contained within the high power combiner [H] in an actual implementation of the system.

The combined RF signal is then applied to one panel of the multi-panel antenna system via a dedicated transmission line [L].

Directional couplers [J] are provided to measure forward and reflected power levels at various points throughout the system. The measured power is fed to the system controller to automatically adjust the individual amplifier gains.

This arrangement is repeated for all of the panels in the antenna system.

Figure 5:
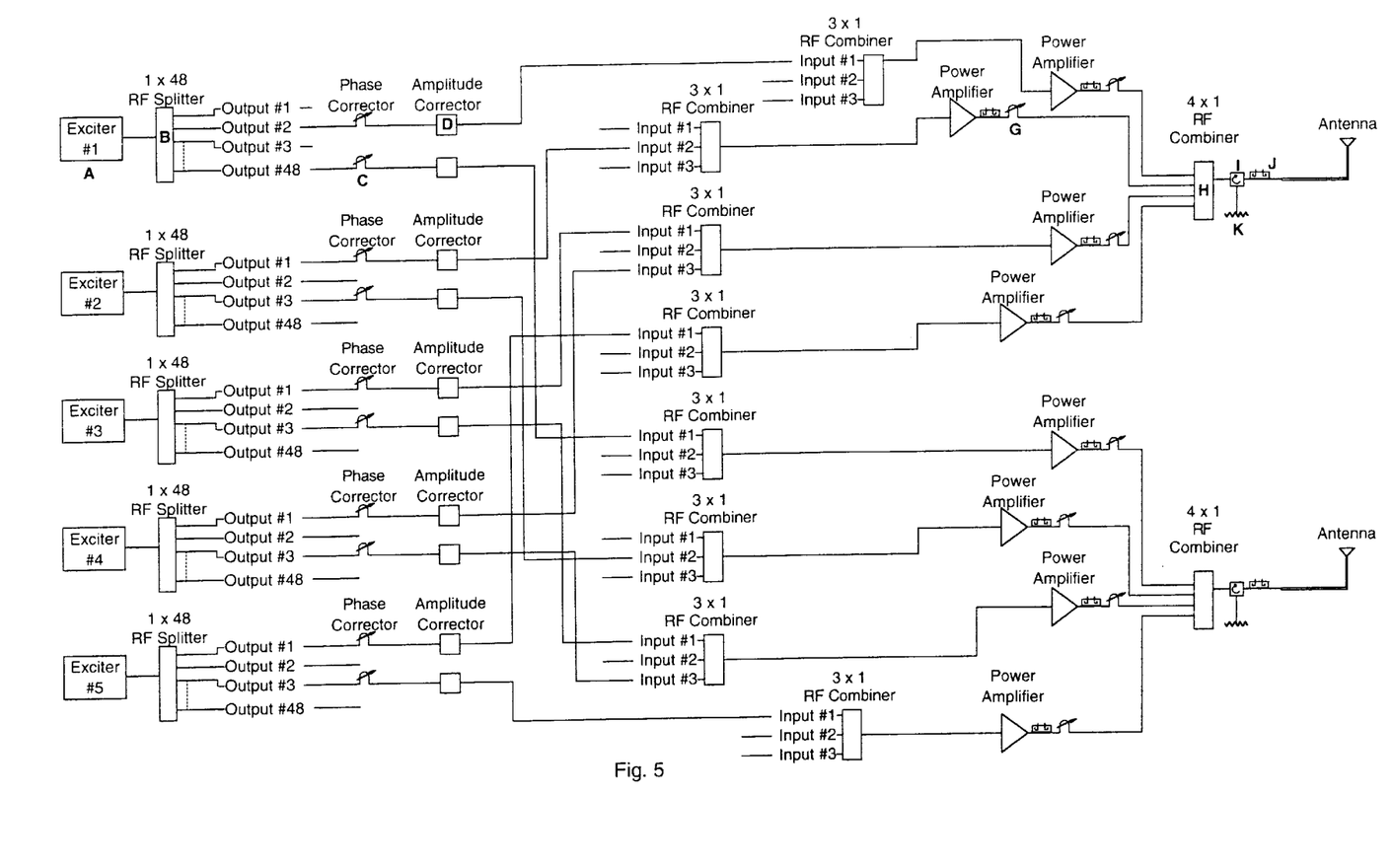
FIG. 5 is a block diagram of a TV transmission system according to the optional embodiment of the present invention.

FIG. 5 illustrates the optional preferred embodiment of the TV antenna system according to the present invention which is specifically intended for high definition television (HDTV). This system can also be used for conventional television signals, however.

For descriptive purposes, only two RF channels of a multi-user, multi-panel antenna system are shown.

The modulated television digital information is up-converted to the appropriate channel in the RF exciter unit [A]. The on-channel RF output signal of the exciter is fed into the input of a 1×48 RF splitter [B]. The forty-eight (48) individual outputs of this splitter are used to selectively feed, via individual phase shifters [C] and amplitude controllers [D], the inputs of eight 3×1 RF combiner units [E].

This technique allows for selective combining of the RF channels to minimize intermodulation products that may be introduced in the RF amplifiers.

The output of each 3×1 combiner [E] is then fed into a dedicated RF amplifier [F]. This unit amplified the combined RF signal of the three selected exciters that supplied to the input of the combiner [E]. The combined and amplified RF signal is then fed to the input of a high power 4×1 RF combiner [H] via individual phase adjustors [G].

The output of the 4×1 combiner contains all of the amplified RF signals for all of the system constituents.

Circulators [I] are provided in each transmission line to isolate load variations and to present an adequate impedance match for the amplifier. Reject power from the antenna system is dissipated in a load [K] attached to one port of the circulator.

The combined RF signal is then applied to one panel of the multi-panel antenna system via a dedicated 7/8" transmission line [L].

Directional couplers [J] are provided to measure forward and reflected power levels at various points throughout the system. The measured power is fed to the system controller to automatically adjust the individual amplifier gains.

This arrangement is repeated for all of the panels in the antenna system.

Figure 6:
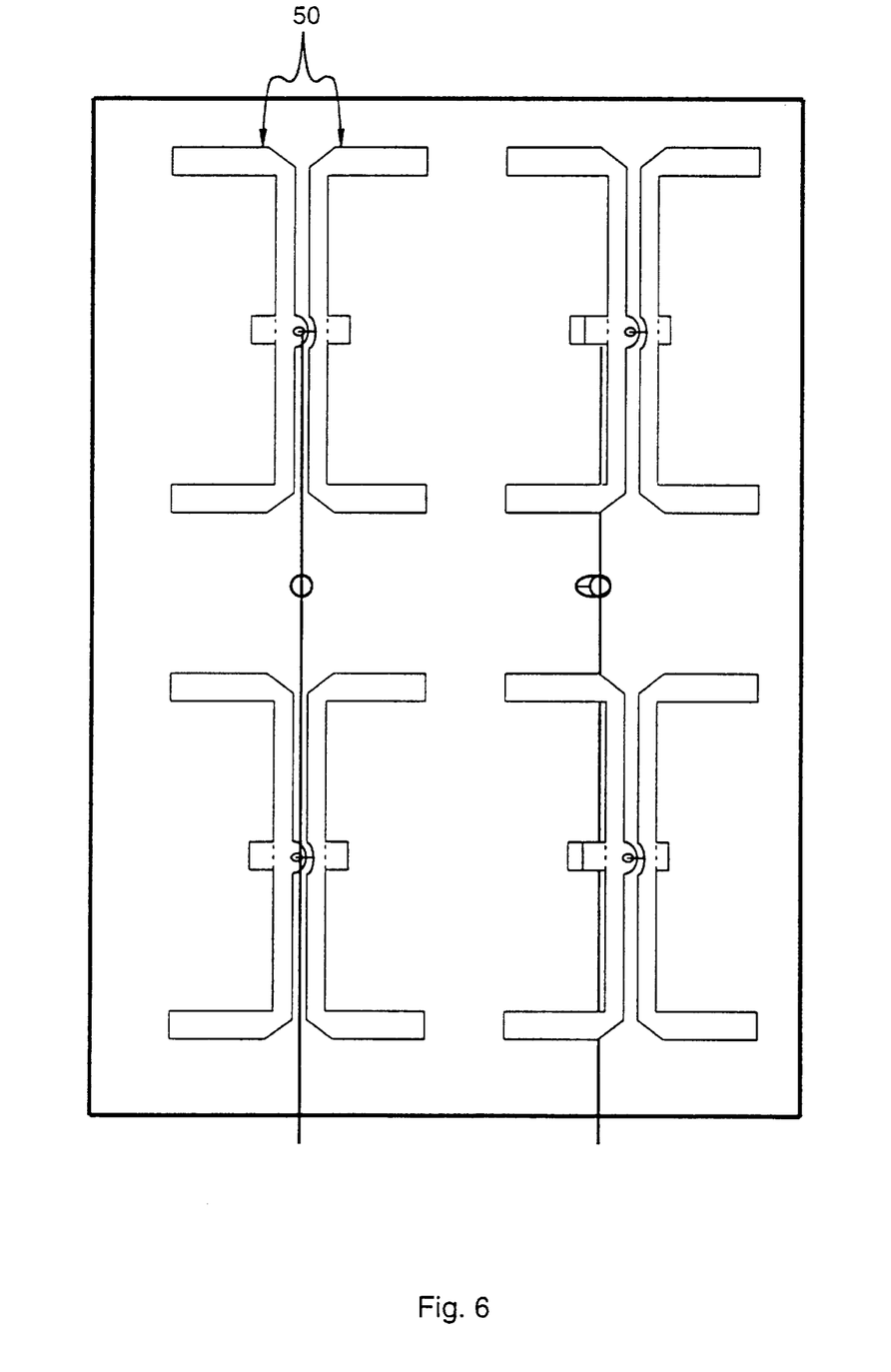
FIG. 6 is an elevational view of a portion of a multi-bay antenna, showing a plurality of antenna elements.
Figure 7:
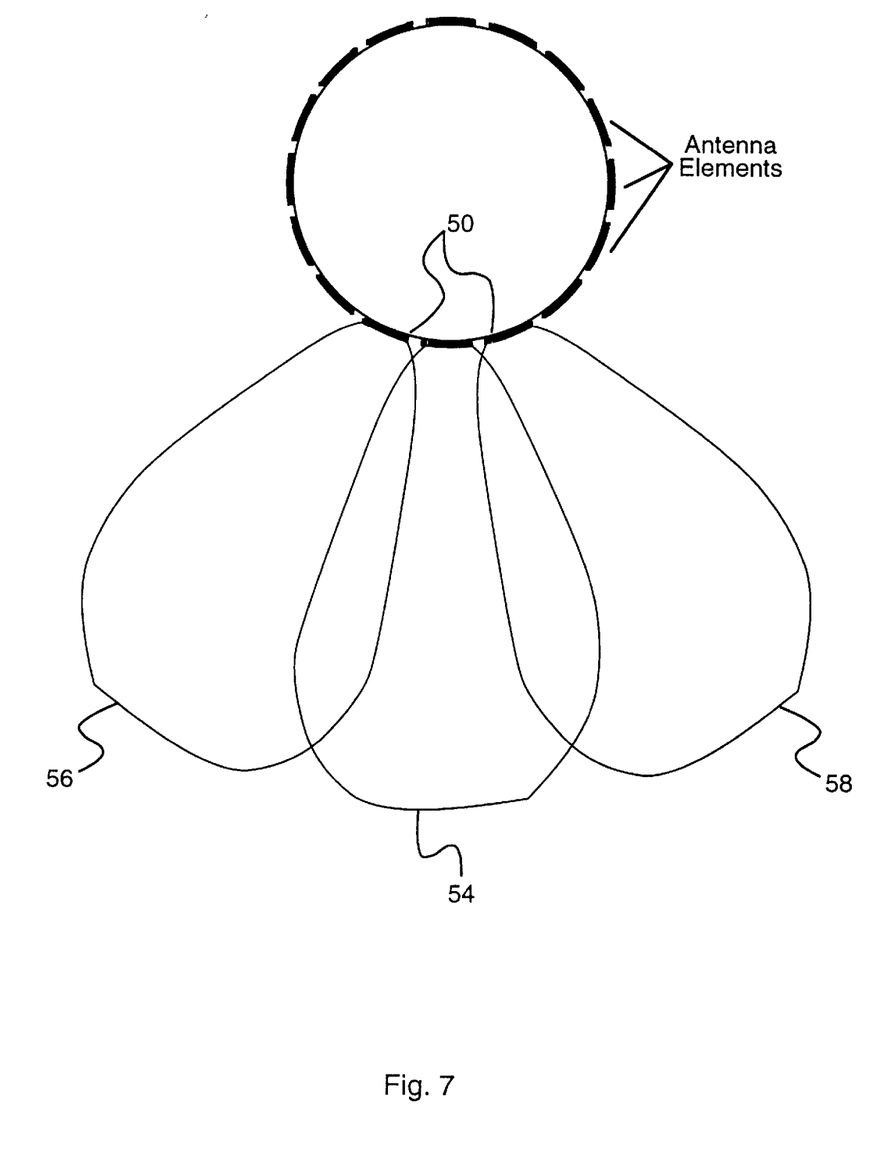
FIG. 7 is a plan view of a multi-bay antenna showing the antenna patterns of several antenna elements.

FIG. 6 illustrates a portion of a panel for a typical, multi-bay antenna. As may be seen, the panel comprises antenna elements 50 which are fed by a transmission conduit 52. In a preferred embodiment of the invention, these antenna elements 50 are arranged in a circular pattern, as shown in FIG. 7, to radiate in substantially all horizontal directions. The transmission patterns 54, 56 and 58 are directional, but overlap to provide uniform omni-directional coverage, if desired. By adjusting the power and phase applied to the various antenna elements, it is possible to "tailor" the antenna pattern, as desired, to a particular geographical area.

Figure 8:
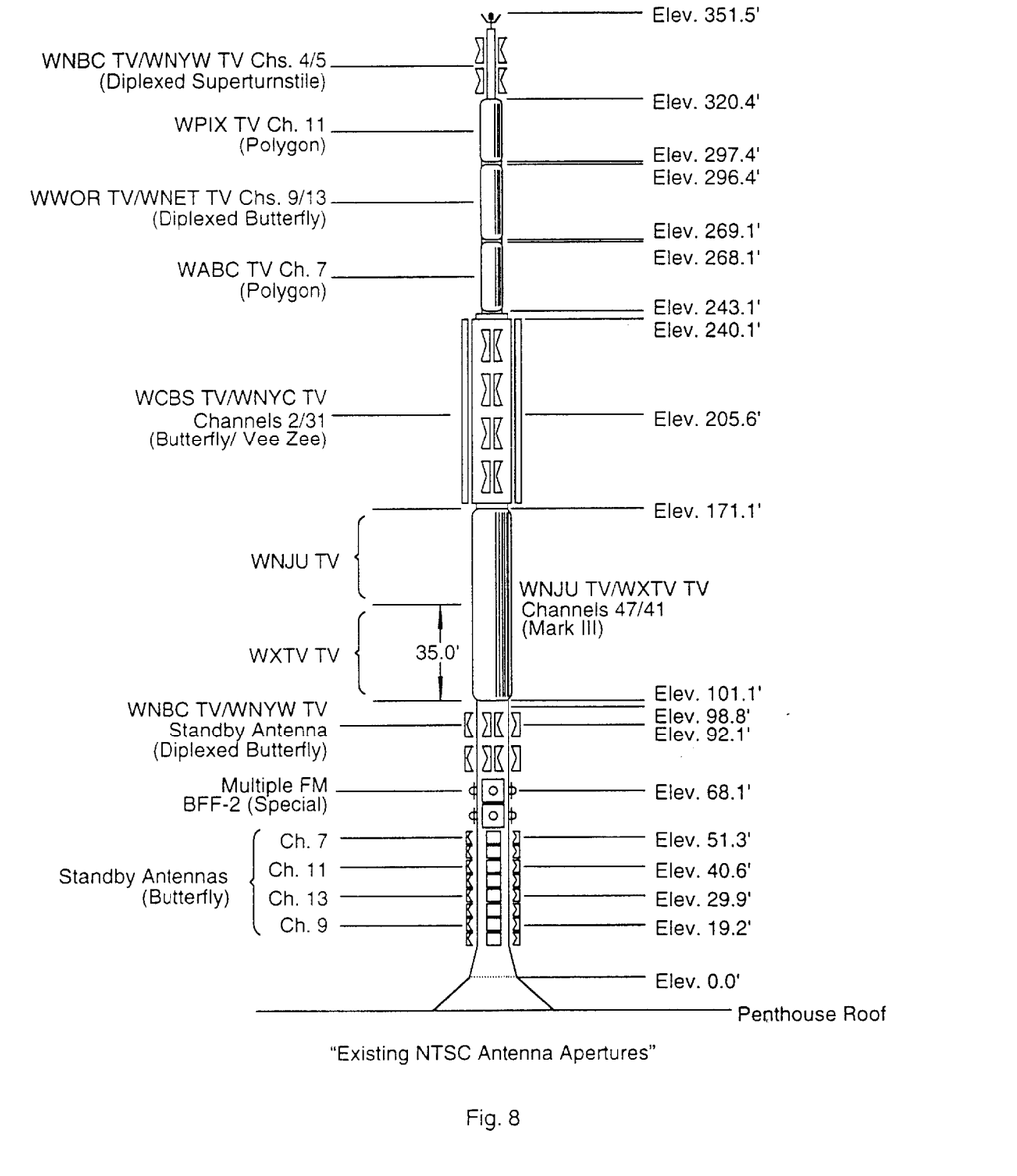
FIG. 8 is an elevational view of the television antenna configuration mounted atop of the World Trade Center in New York City.

FIG. 8 shows the actual TV antenna configuration for the antenna structure atop the World Trade Center in New York, N.Y. As may be seen, the different sections of the antenna are designed differently. The present invention is preferably applied to the antenna structure shown as Section F—F.

There has thus been shown and described a novel television transmission system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A television (TV) transmission system adapted to receive a plurality (n) of TV signals, V1, V2 ... Vi, ... Vn, and to transmit said TV signals at a plurality (n) of channel frequencies, Q1, Q2, ... Qi, ... Qn, respectively, said system comprising:

(a) a plurality (n) of exciters, A1, A2, ... Ai, ... An, each exciter, Ai, having an input for receiving one of said TV signals, Vi, and operative to combine said TV signal, Vi, with a carrier signal at a respective one of said channel frequencies, Qi, to produce a transmittable signal, Ti;

(b) a plurality (n) of signal splitters, B1, B2 ... Bi, ... Bn, each splitter, Bi, being coupled to receive a transmittable signal, Ti, from a corresponding one of said exciters, Ai, and producing therefrom a plurality (m) of splitter signals, S1, S2 ... Si, ... Sm;

(c) a plurality of phase shifting/amplitude adjusting networks, each connected to receive one of the signals Si;

(d) a plurality of power amplifiers, one per channel up to one per antenna feed, connected to receive the outputs of said networks;

(e) a plurality (j) of power combiners, E1, E2 . . . Ei, . . . Ej, each power combiner, Ei, coupled to receive an amplified signal, Si, from a plurality of the power amplifiers, and producing therefrom a single combined output signal, Oi;

(f) a plurality (k) of antenna elements, M1, M2 . . . Mi, . . . Mk, each antenna element, Mi, coupled to receive a representation of said output signal, Oi, of at least one of said first combiners;

whereby said antenna elements radiate electromagnetic waves in response to their received signals.

2. The TV transmission system defined in claim 1, further comprising a plurality (j) of power amplifiers, F1, F2 . . . Fi, . . . Fj, each coupled to receive an output signal, Oi, from one of said first combiners, Ei, and to produce a representation of the received output signal with increased gain for transmission to an antenna element, Mi.

3. The TV transmission system defined in claim 1, further comprising a plurality of first phase correctors, C1, C2 . . . Ci, . . . Cx, each coupled to receive a splitter signal, Si, from one of said splitters and to adjust the phase thereof, thereby to equalize the phase of all splitter signals produced by said one splitter.

4. The TV transmission system defined in claim 1, further comprising a plurality of amplitude correctors, D1, D2 . . . Di, . . . Dx, each coupled to receive a splitter signal, Si, from one of said splitters and to adjust the gain thereof, thereby to equalize the gain of all splitter signals produce by said one splitter.

5. The TV transmission system defined in claim 1, further comprising a plurality (k) of second combiners, H1, H2 . . . Hi, . . . Hk, each coupled to receive the output signal, Oi, from a plurality of said first combiners, and producing therefrom a single combined antenna signal, Ti, for transmission to an antenna element, Mi.

6. The TV transmission system defined in claim 2, further comprising a plurality (j) of second phase correctors, G1, G2 . . . Gi, . . . Gj, each coupled to receive the representation of first output signal, Oi, produced by a power amplifier, Fi, and to adjust the phase thereof, thereby to equalize the phase of said first output signals.

7. The TV transmission system defined in claim 2, further comprising a plurality (j) of first bandpass filters, N1, N2 . . . Ni, . . . Nj, each coupled to receive the representation of first output signal, Oi, produced by a power amplifier, Fi, and to pass selected frequencies thereof, thereby to ensure that all frequencies transmitted by the antenna element coupled thereto are within a desired range.

8. The TV transmission system defined in claim 5, further comprising a plurality (k) of second bandpass filters, J1, J2 . . . Ji, . . . Jk, each coupled to receive one of said combined antenna signal, Ti, and to pass selected frequencies thereof, thereby to ensure that all frequencies transmitted by the antenna element coupled thereto are within a desired range.

9. The TV transmission system defined in claim 5, further comprising a plurality (k) of circulators, I1, I2 . . . Ii, . . . Ik, each coupled to receive one of said combined antenna signal, Ti, and to pass said signal to an antenna element, Mi, and to a prescribed impedance, Ki, thereby to provide a substantially exact impedance match to said antenna element, Mi.

10. The TV transmission system defined in claim 2, further comprising a plurality (k) of circulators, I1, I2 . . . Ii, . . . Ik, each coupled to receive a representation of said output signal, Oi, and to pass said signal to an antenna element, Mi, and to a prescribed impedance, Ki, thereby to provide a substantially exact impedance match to said antenna element, Mi.

11. The TV transmission system defined in claim 1, wherein said antenna elements are substantially directional and are arranged as a group to radiate in a plurality of different horizontal directions.

12. The TV transmission system defined in claim 11, wherein said antenna elements are arranged as a group to radiate in substantially all horizontal directions.

\* \* \* \* \*